US009715706B2

(12) United States Patent
Wu et al.

(10) Patent No.: US 9,715,706 B2
(45) Date of Patent: Jul. 25, 2017

(54) SYSTEM AND METHOD FOR GRAPHICAL USER INTERFACE HAVING A SOCIAL MEDIA MULTIMEDIA CONTAINER

(71) Applicant: Rakuten Kobo, Inc., Toronto (CA)

(72) Inventors: James Wu, Toronto (CA); Robin Bennett, Toronto (CA); Daniel Hill, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 256 days.

(21) Appl. No.: 14/019,286

(22) Filed: Sep. 5, 2013

(65) Prior Publication Data

US 2014/0063051 A1 Mar. 6, 2014

Related U.S. Application Data

(60) Provisional application No. 61/697,077, filed on Sep. 5, 2012.

(51) Int. Cl.
G06Q 30/06 (2012.01)
G06Q 10/10 (2012.01)
G06Q 50/00 (2012.01)
G06T 11/60 (2006.01)
G06F 3/0481 (2013.01)
G06F 3/0485 (2013.01)
G06F 17/21 (2006.01)

(52) U.S. Cl.
CPC ....... G06Q 30/0631 (2013.01); G06F 3/0485 (2013.01); G06F 3/04812 (2013.01); G06F 17/212 (2013.01); G06Q 10/10 (2013.01); G06Q 50/01 (2013.01); G06T 11/60 (2013.01)

(58) Field of Classification Search
None
See application file for complete search history.

(56) References Cited

U.S. PATENT DOCUMENTS

2011/0016419 A1* 1/2011 Grosz ................ G06F 17/3028
715/769
2011/0246495 A1* 10/2011 Mallinson ......... G06F 17/30026
707/758

(Continued)

Primary Examiner — James A Thompson
(74) Attorney, Agent, or Firm — Oblon, McClelland, Maier & Neustadt, L.L.P.

(57) ABSTRACT

A system and method for rendering a graphical user interface. The method includes accessing, within a mobile device, a data store corresponding to a social media multimedia container. The social media multimedia container comprises a plurality of objects and a first subset of the plurality of objects comprises a first social media application and second social media application and a second subset of the plurality of objects comprises a first social media widget. The social media multimedia container is operable to comprise one or more applications, widgets, pieces of content, and other multimedia containers. The method further includes displaying a first plurality of images each corresponding to the first social media application and the second social media application in a linear configuration and displaying a first image corresponding to the first social media widget. The first image is adjacent to a second image of the plurality of images corresponding to the first social media application.

22 Claims, 7 Drawing Sheets

(56) References Cited

U.S. PATENT DOCUMENTS

| | | | |
|---|---|---|---|
| 2013/0054700 A1* | 2/2013 | Allibhoy | G06Q 30/0241 |
| | | | 709/204 |
| 2013/0117378 A1* | 5/2013 | Kotorov | G06Q 50/01 |
| | | | 709/205 |
| 2013/0145360 A1* | 6/2013 | Ricci | G06F 9/54 |
| | | | 717/174 |
| 2013/0254036 A1* | 9/2013 | Trinh | G06Q 30/0251 |
| | | | 705/14.64 |

* cited by examiner

400

600

Accessing A Data Store Corresponding To A Social Multimedia Container
602

Determining Whether A User Has An Account With A Social Media Website
604

Automatically Adding A Social Media Widget To The Social Media Multimedia Container
606

Displaying A First Plurality Of Images In A Linear Configuration
608

Displaying A First Image Corresponding To A First Social Media Widget
610

Displaying A Second Image Corresponding To A Piece Of Content
612

Displaying A Third Image Corresponding To A Second Social Media Widget
614

FIG. 6

SYSTEM AND METHOD FOR GRAPHICAL USER INTERFACE HAVING A SOCIAL MEDIA MULTIMEDIA CONTAINER

CROSS REFERENCE TO RELATED APPLICATIONS

This application claims the benefit of and priority to the provisional patent application, Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application claims the benefit of and priority to the copending non-provisional patent application Ser. No. 13/601,363, entitled "SYSTEM AND METHOD FOR A MULTIMEDIA CONTAINER," with filing date May 23, 2013, and hereby incorporated by reference in its entirety.

This application claims the benefit of and priority to the copending non-provisional patent application Ser. No. 13/601,426, entitled "SYSTEM AND METHOD FOR MANAGING OBJECTS IN A MULTIMEDIA CONTAINER," with filing date May 23, 2013, and hereby incorporated by reference in its entirety.

This application claims the benefit of and priority to the copending non-provisional patent application Ser. No. 13/601,465, entitled "SYSTEM AND METHOD FOR DISPLAYING A MULTIMEDIA CONTAINER," with filing date May 23, 2013, and hereby incorporated by reference in its entirety.

This application claims the benefit of and priority to the copending non-provisional patent application Ser. No. 13/601,468, entitled "SYSTEM AND METHOD FOR A HOME MULTIMEDIA CONTAINER," with filing date May 23, 2013, and hereby incorporated by reference in its entirety.

This application claims the benefit of and priority to non-provisional patent application Ser. No. 13/987,684, entitled "SYSTEM AND METHOD FOR NAVIGATION OF A MULTIMEDIA CONTAINER," with filing date Aug. 20, 2013, and hereby incorporated by reference in its entirety.

FIELD OF THE INVENTION

Embodiments of the present invention are generally related to graphical user interfaces that may be part of a mobile device operating system.

BACKGROUND

As computing technology has advanced, computers have become smaller and more portable thereby bringing about powerful handheld devices capable of performing functions of more traditional computing technology. At the same time operating systems for handheld devices or mobile devices have been developed to better suit handheld devices. Such operating systems have conventionally been focused around applications. For example, upon turning on a handheld device, the user is presented with a fixed grid of icons of representing applications that the user can choose from.

In such an application or "app centric" interface, a user's content is accessed by first accessing an application for the type of content and then selecting the desired piece of content. For example, in order for a user to access music, a music application is launched and then the desired music is selected for playback. Similarly, in order for a user to browse a website, a web browser is launched and the user enters or selects the desired website or URL (uniform resource locator). In other words, mobile operating systems are focused on or centered around applications and a user enters an application in order to access or consume content.

SUMMARY OF THE INVENTION

Accordingly, what is needed is a solution to allow applications, widgets, and content (e.g., social media widgets, applications, and content) to be organized and viewed in useful manner allowing efficient browsing and navigation. Embodiments of the present invention are operable for concurrent viewing and browsing of a plurality of social media widgets of a multimedia container, for instance. The plurality of social media widgets may be adjacent to one or more social media application icons (e.g., in a vertical configuration or layout) and adjacent to one or more pieces of content, e.g., photo, video, audio, etc. Embodiments of the present invention may further add (e.g., automatically) one or more widgets (e.g., social media widgets) based on one or more websites where a user has a respective account.

In one embodiment, the present invention is directed to a method for rendering a graphical user interface on a computer system. The method includes accessing, within a mobile device, a data store corresponding to a social media multimedia container. The social media multimedia container comprises a plurality of objects and a first subset of the plurality of objects comprises a first social media application and second social media application and a second subset of the plurality of objects comprises a first social media widget. The first social media application may corresponds to a social networking website or a microblogging website. The plurality of objects may further comprise a third social media application which corresponds to a social visual bookmarking website. The social media multimedia container is operable to comprise one or more applications, widgets, pieces of content, and other multimedia containers. The method further includes displaying a first plurality of images each corresponding to the first social media application and the second social media application in a linear configuration (e.g., vertical configuration or column) and displaying a first image corresponding to the first social media widget. The first image is adjacent to a second image of the plurality of images corresponding to the first social media application.

The method may further include determining whether a user has an account with one or more social media websites and automatically adding a respective widget to the social media multimedia container for each social media application corresponding to the one or more social media websites which the user has an account. In one embodiment, the social media multimedia container comprises a third object which corresponds to a piece of content and the method further includes displaying a third image corresponding to the piece of content adjacent to the first image.

In one embodiment, the present invention is directed toward a computer-readable storage medium having stored thereon, computer executable instructions that, if executed by a computer system cause the computer system to perform a method for displaying a graphical user interface. The method includes accessing, within a mobile device, a data store corresponding to a social media multimedia container. The social media multimedia container comprises a plurality of objects and a first subset of the plurality of objects comprises a first social media application and second social media application and a second subset of the plurality of objects comprises a social media widget. The social media multimedia container is operable to comprise one or more applications, widgets, pieces of content, and other multimedia containers. The method further includes determining whether a user has an account with a social media website and automatically adding a social media widget to the social media multimedia container for a social media application corresponding to the social media website which the user has an account. The method further includes displaying a first plurality of images each corresponding to the first social media application and the second social media application in a vertical configuration at a left portion of a display device and displaying a first image corresponding to a social media widget. The first image is adjacent to a second image of the plurality of images corresponding to the first social media application.

In one embodiment, the social media multimedia container comprises a third object which corresponds to a piece of content, and the method further includes displaying a third image corresponding to the piece of content adjacent to the first image. The first social media application may correspond to a social networking website and a microblogging website. The plurality of objects may further include a third social media application which corresponds to a social visual bookmarking website. The social media multimedia container may further include a third object corresponding to a voice-over-IP (VOIP) service application. The second subset of objects may include a second social media widget and the method further includes displaying a third image corresponding to the second social media widget adjacent to the first plurality of images.

In another embodiment, the present invention is implemented as a system for displaying a graphical user interface. The system includes a data store access module operable to access a data store corresponding to a social media multimedia container. The social media multimedia container comprises a plurality of objects and a first subset of the plurality of objects comprises a first social media application and second social media application and a second subset of the plurality of objects comprises a social media widget. The social media multimedia container is operable to comprise one or more applications, widgets, pieces of content, and other multimedia containers. The system further includes a display module operable to display a first plurality of images each corresponding to the first social media application and the second social media application in a vertical configuration at a left portion of a display device and further operable to display a first image corresponding to the social media widget. The first image is adjacent to a second image of the plurality of images corresponding to the first social media application. The system further includes an account determination module operable to determine whether a user has an account with one or more social media websites and a widget addition module operable to add a respective widget to the social media multimedia container for each social media application corresponding to the one or more social media websites which the user has an account.

In one embodiment, the social media multimedia container comprises a third object which corresponds to a piece of content, and the display module is operable to display a third image corresponding to the piece of content adjacent to the first image. The first social media application may correspond to a social networking website or a microblogging website. In one embodiment, the plurality of objects further comprises a third social media application and third social media application corresponds to a social visual bookmarking website. The second subset of objects may comprise a second widget and the display module is operable to display a third image corresponding to the second widget adjacent to the first plurality of images.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 6 shows a flowchart of an exemplary computer controlled process for generating a graphical user interface in accordance with one embodiment of the present invention.

DETAILED DESCRIPTION OF THE INVENTION

Figure 1:
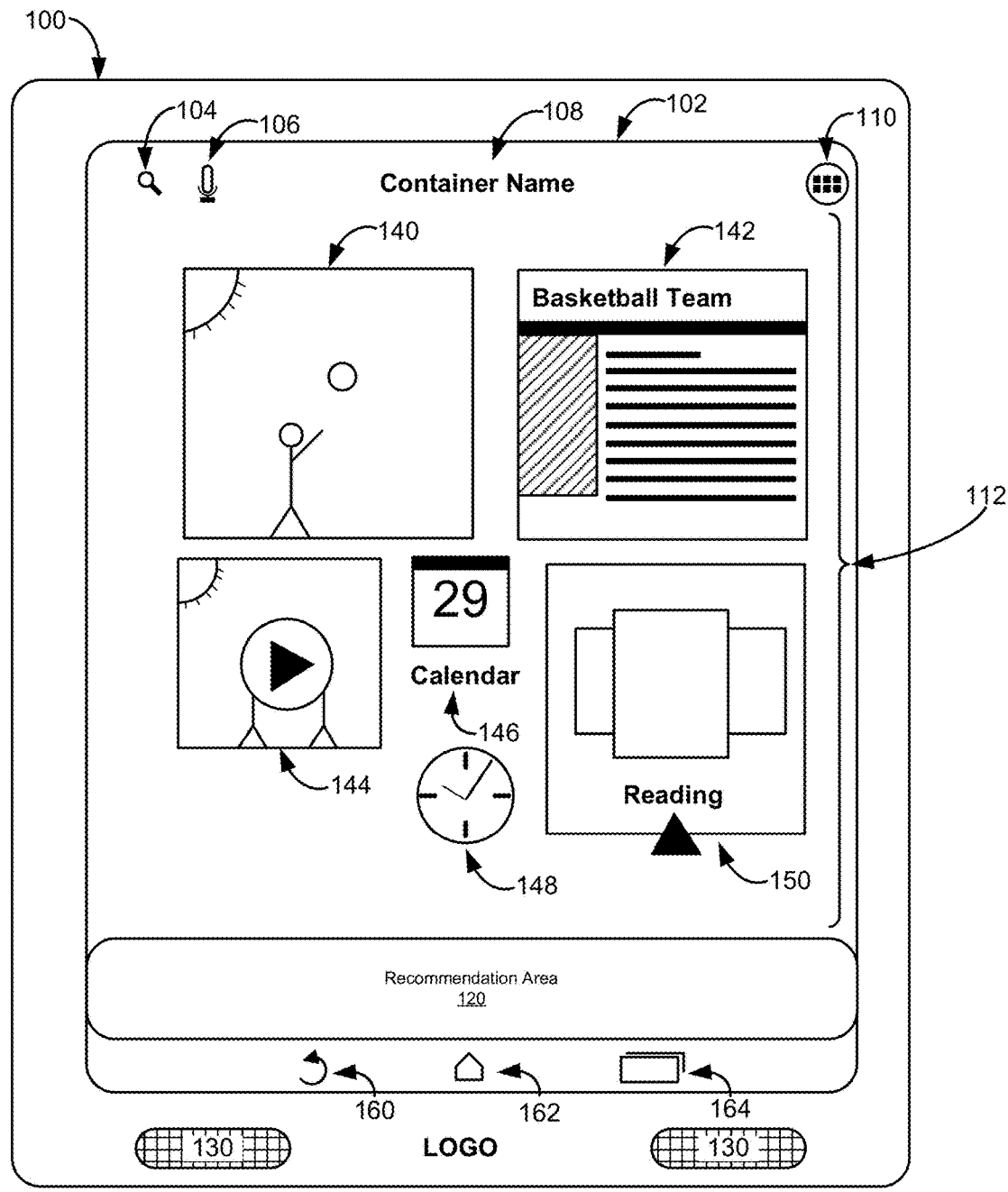
FIG. 1 shows an exemplary mobile device and an exemplary graphical user interface in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 700 of FIG. 7), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for a Graphical User Interface Having a Social Media Multimedia Container Embodiments of the present invention are operable for concurrent viewing and browsing of a plurality of social media widgets of a multimedia container, for instance. The plurality of social media widgets may be adjacent to one or more social media application icons (e.g., in a vertical configuration or layout) and adjacent to one or more pieces of content, e.g., photo, video, audio, etc. Embodiments of the present invention may further add (e.g., automatically) one or more widgets (e.g., social media widgets) based on one or more websites where a user has a respective account.

FIGS. 1-5 illustrate example components used by various embodiments of the present invention. Although specific components are disclosed in FIGS. 1-5, it should be appreciated that such components are exemplary. That is, embodiments of the present invention are well suited to having various other components or variations of the components recited in FIGS. 1-5. It is appreciated that the components in FIGS. 1-5 may operate with other components than those presented, and that not all of the components of FIGS. 1-5 may be required to achieve the goals of embodiments of the present invention.

FIG. 1 shows an exemplary mobile device and an exemplary multimedia container of an exemplary graphical user interface, in accordance with one embodiment of the present invention. FIG. 1 depicts an exemplary graphical user interface comprising an exemplary multimedia container displayed by a device (e.g., tablet computing device, mobile phone, smartphone, or the like).

In one embodiment, device 100 is a mobile computing device (e.g., tablet). Device 100 comprises speakers 130 and screen 102. In one embodiment, screen 102 is a touch sensitive (e.g., a capacitive touch screen) operable to receive input (e.g., from a user via one or more fingers) and display a graphical user interface. Speakers 130 are operable for output of audio during rendering of content (e.g., video, video games, animations, system functions, etc.).

Device 100 is operable to render a graphical user interface comprising a multimedia container. A multimedia container is a graphically navigable container that is operable to hold various objects of various media types (e.g., content), applications, widgets, and other multimedia containers. A multimedia container may include other multimedia containers therein which may further include respective content, applications, widgets, etc. In one exemplary embodiment, a multimedia container may include a song, an e-book, a video, a webpage, a contract, an email message, a text message, an application, etc. Multimedia containers display content in a pictorial manner thereby surfacing content for immediate consumption.

FIG. 1 depicts an exemplary graphical user interface rendered by device 100. The exemplary graphical user interface comprises search icon 104, voice recognition icon 106, container name 108, applications icon 110, object area 112, recommendation area 120, and control icons 160-164. Container name 108 indicates the name of the multimedia container being displayed. It is noted the objects within the multimedia container described herein are exemplary and embodiments of the present invention can support more or less objects.

Object area 112 comprises pieces of content, application icons, widgets, and other multimedia containers within a multimedia container being displayed. In one exemplary embodiment, object area 112 includes image 140, website image 142, video image 144, application icon 146, widget 148, and multimedia container image 150. Pieces of content may be shown in pictorial form (e.g., without filenames). Objects in object area 112 can be resized by a user. Objects within object area 112 are selectable to launch a corresponding application or corresponding application for rendering content corresponding to the object in object area 112. Objects within object area 112 may be moved around (e.g., via dragging after selection via pressing and holding) or resized (e.g., via pressing and holding and manipulating a size control).

Image 140 is an image (e.g., scaled image, thumbnail, or the like) corresponding to an image that is stored on device 100. In one exemplary embodiment, image 140 is a scaled version of a child playing basketball (e.g., without a filename). Image 140 is selectable (e.g., via a touch or press) and is operable to launch an image viewing application to display an image corresponding to image 140 at full resolution. For example, a user can view image 140 at one resolution within the multimedia container and to see more detail a user can select image 140 to see the high resolution image that image 140 corresponds thereto.

Website image 142 corresponds to a rendering of a webpage (e.g., via a browser). In one exemplary embodiment, website image 142 is a scaled version of a rendering of the webpage according to a size specified corresponding to a multimedia container. In another embodiment, website image 142 is an image determined and selected from the content of the website corresponding to website image 142. Website image 142 is operable to be selected (e.g., via a touch or press) and is operable to launch a web browser to display the website corresponding to website image 142. Website image 142 and other objects within a multimedia container may be updated periodically (e.g., hourly, daily, and the like). In one embodiment, website image 142 and other objects are updated each time a user accesses the content corresponding to the object (e.g., the website corresponding to website image 142).

Video image 144 corresponds to a video (e.g., stored locally on device 100 or available over a communications network). In one embodiment, video image 144 is a scaled version (e.g., thumbnail) of a key frame of a video with an optional title. In one exemplary embodiment, video image 144 is a scaled version of a key frame of the video scaled according to a size specified corresponding to a multimedia container. Video image 144 is operable to be selected (e.g., via a touch or press) and is operable to launch a video application (e.g., for a video stored locally on device 100 or available for streaming) or launch a website with the video corresponding to video image 144.

Application icon 146 corresponds to an application and is selectable to launch the corresponding application. In one exemplary embodiment, application icon 146 corresponds to a calendar application and application icon 146 comprises an image of a calendar with the current date and text below with the name of the application.

Widget 148 is a widget and is operable to display live, auto-updating content. In one exemplary embodiment, widget 148 is a clock widget operable to display the current time. In one embodiment, widget 148 is operable to be selected (e.g., via touch or press) and upon selection launch a corresponding application (e.g., a clock application with alarm, timer, and stopwatch functionality).

Recommendation area 120 is operable to display recommendations of content (e.g., free or pay content) based on the objects of a multimedia container (e.g., based on the metadata associated with the objects of a multimedia container). In one embodiment, recommendation area 120 includes images representing content that is recommended based on the pieces of content (and/or applications and widgets) in the multimedia container.

Multimedia container image 150 is of a reading related multimedia media container which may include reading related objects (e.g., electronic book related application, widgets, and content). In one embodiment, display of multimedia container image 150 comprises images of objects within the multimedia container corresponding to multimedia image 150. In one exemplary embodiment, multimedia container image 150 includes an outerframe and triangle to indicate to a user that multimedia container image 150 corresponds to a multimedia container and selecting (e.g., via touch or press) launches display of the multimedia container. Multimedia container image 150 may be selected with a press and hold interaction and then dragged around to move multimedia container image 150.

Control icons 160-164 are operable for navigation of a plurality of multimedia containers and switching applications. Back control 160 is operable for navigation to a previous multimedia container. Home control 162 is operable for navigating to a home multimedia container. Recent applications button 164 is operable to invoke a function for changing or switching applications.

Applications icon 110 is operable for invoking display of a graphical user interface for browsing application icons and launching corresponding applications. In one embodiment, the graphical user interface for browsing applications is organized into multiple pages of application icons.

Figure 2:
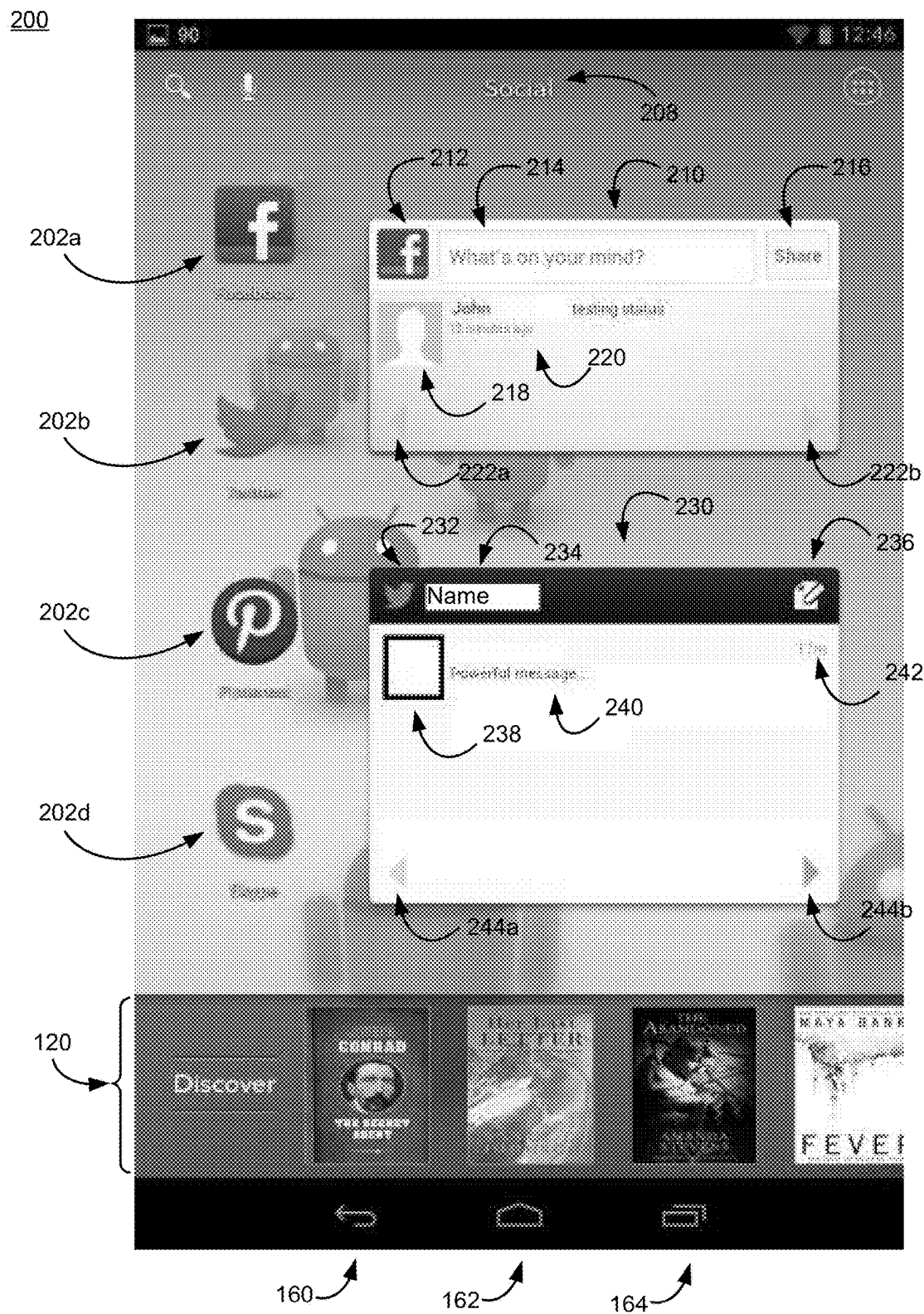
FIG. 2 shows an exemplary graphical user interface of a social media multimedia container in accordance with one embodiment of the present invention.

FIG. 2 shows an exemplary graphical user interface of a social media multimedia container in accordance with one embodiment of the present invention. FIG. 2 depicts an exemplary graphical user interface 200 displaying the contents of a social media multimedia container including social media application icons and social media widgets. In one embodiment, exemplary graphical user interface 200 includes elements similar to exemplary graphical user interface 100. Exemplary graphical user 200 includes multimedia container label 208, application images 202a-d, recommendation area 204, social media widget images 210 and 230.

Exemplary graphical user interface 200 may allow a user to concurrently view and browse a plurality of social media widgets. In one embodiment, exemplary graphical user interface 200 may display preloaded objects (e.g., applications, widgets, and pieces of content) of a social media multimedia container. More objects may be added to the social media container and objects (e.g., preloaded objects) may be removed from the social media container. In one exemplary embodiment, the widgets of the social media multimedia container are added upon a user creating an account with a website (e.g., social media website) or a determination of whether a user has an account with a website, as described herein.

Container name 208 indicates the name of the multimedia container being displayed. For example, the social media multimedia container may have a name of "Social." Application images or icons 202a-d correspond to applications within the social media multimedia container. Application images 202a-d are operable to be selected by a user (e.g., via touch or press) and in response, the corresponding application is launched. In one embodiment, application images 202a-d are displayed in a linear configuration (e.g., vertical column and/or adjacent to social media widgets). In one exemplary embodiment, application images 202a-d correspond to applications for social media websites including Facebook™ of Menlo Park, Calif., Twitter™ from Twitter Corporation of San Francisco, Calif., Pinterest™ of Pinterest Corporation of Palo Alto, Calif., and Skype™ from Microsoft Corporation of Redmond, Wash.

Social media widget images 210 and 230 correspond to widgets for accessing portions of social media websites. In one exemplary embodiment, social media widget image 210 corresponds to Facebook™ of Menlo Park, Calif. and social media widget image 230 corresponds to Twitter™ from Twitter Corporation of San Francisco. Social media widget images 210 and 230 may thus allow a user to see recent postings from various social media websites within the same display screen.

Social media widget image 210 may include logo image 212, text box 214, button 216, user image 218, message area 220, and navigation buttons 222a-b. Logo image 212 may include the logo of the company corresponding to the social media widget. In one embodiment, text box 214 may allow a user to enter text (e.g., a status update) and use button 216 to submit the text to a social media website corresponding to the widget. User image 218 may include an image of a user that is the author of the message in message area 220. Message area 220 may include a message (e.g., status update, etc.) from a user or other account on the social media website. For example, message area 220 may include a user identifier (e.g., username) and a timestamp or how long ago the message was posted to the social media website. Navigation buttons 222a-b are operable for navigation (e.g., right or left) between multiple messages and other content of the social media website.

Social media widget image 230 may include logo image 232, username area 234, post button 236, user image 238, message area 240, timestamp 242, and navigation buttons 244a-b. Logo image 232 may include the logo of the company corresponding to the social media widget. Username area 234 indicates the user's name. Post button 236 is operable for invoking a post or submission feature of an application corresponding to a social media website. User image 238 may include an image of a user that is the author of the message in message area 240. Message area 240 may include a message (e.g., status update, microblog entry, etc.) from a user or other account on the social media website. Timestamp 242 may indicate when or how long ago the message was posted to the social media website. Navigation buttons 244a-b are operable for navigation (e.g., right or left) between multiple messages and other content of the social media website.

Figure 3:
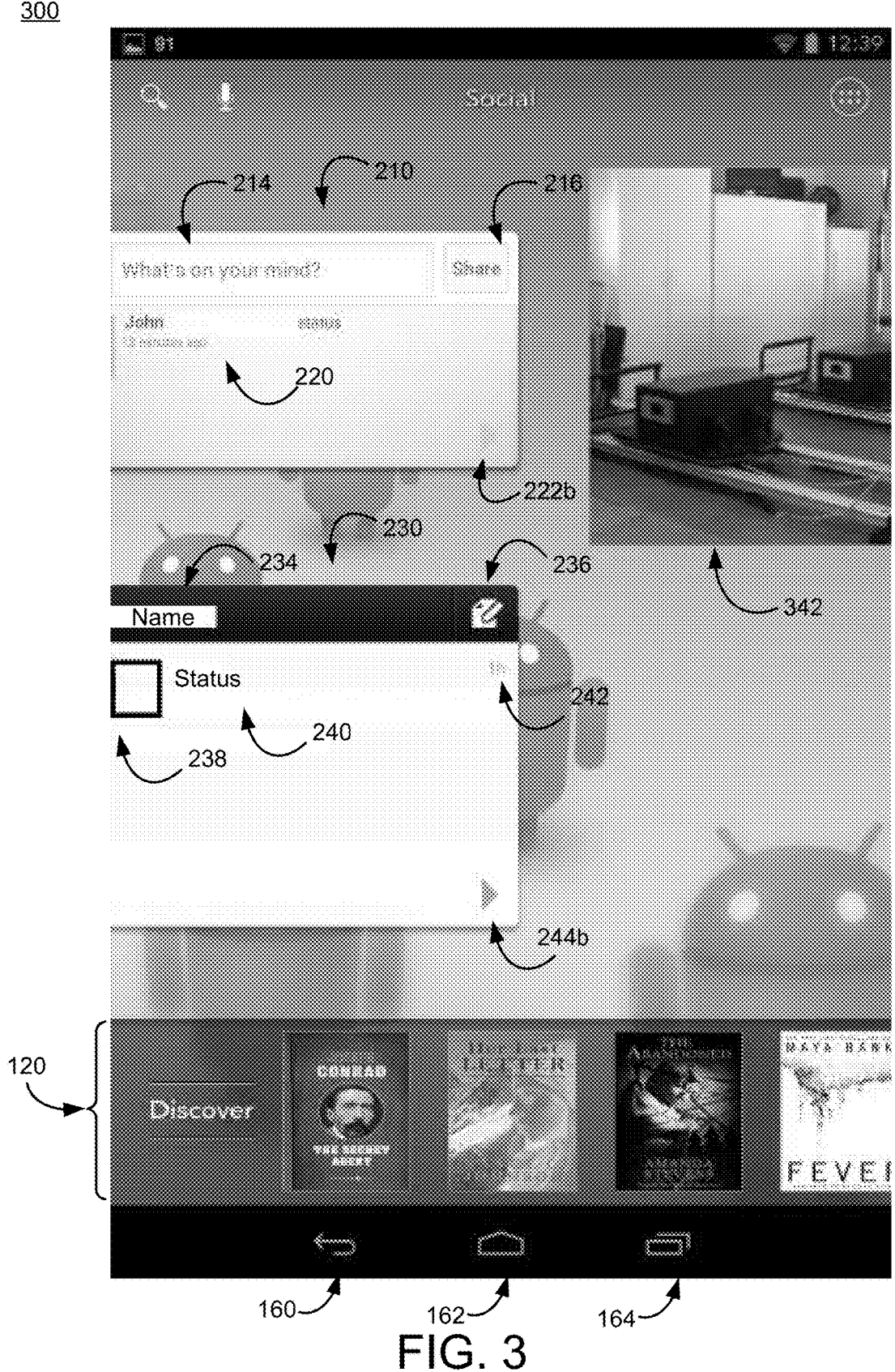
FIG. 3 shows an exemplary graphical user interface of a social media multimedia container having a piece of content therein in accordance with one embodiment of the present invention.

FIG. 3 shows an exemplary graphical user interface of a social media multimedia container having a piece of content therein in accordance with one embodiment of the present invention. FIG. 3 depicts a graphical user interface of a social media multimedia container with a piece of content adjacent to a social media widget (e.g., during scrolling navigation of the social media multimedia container). In one embodiment, exemplary graphical user interface 300 includes elements similar to exemplary graphical user interface 200. Exemplary graphical user interface 300 includes social media widget images 210 and 230 and content image 342.

Social media widget images 210 and 230 correspond to widget of social media websites, as described herein. Content image 342 corresponds to a piece of content added to the social media multimedia container being displayed. In one exemplary embodiment, content image 342 is adjacent (e.g., directly) to a social media widget (e.g., corresponding to a social media widget image 210). Embodiments of the present invention thus support the pieces of content adjacent to social media widgets adjacent to social media application icons.

Figure 4:
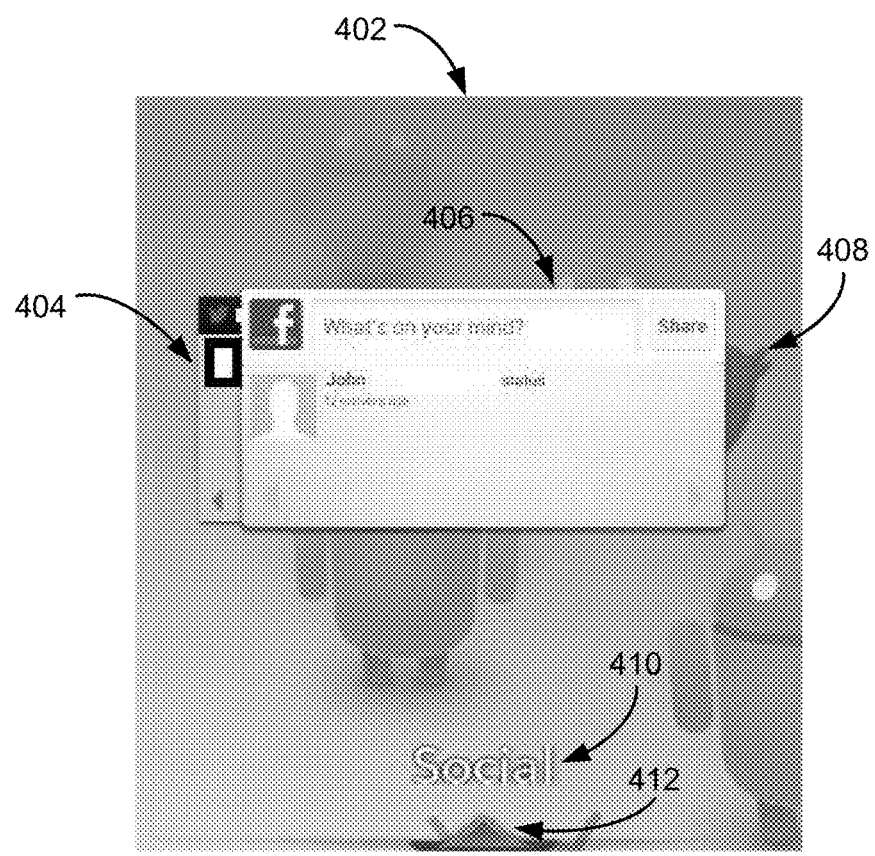
FIG. 4 shows a portion of an exemplary graphical user interface having a minimized social media container with an image corresponding to a widget in accordance with one embodiment of the present invention.

FIG. 4 shows a portion of an exemplary graphical user interface having a minimized social media container with an image corresponding to a widget in accordance with one embodiment of the present invention. FIG. 4 depicts an graphical user interface 400 comprising an image 402 of a minimized social media multimedia container.

Image 402 comprises shape 412, label 410, and images 404-408. Shape 412 is operable to indicate to a user that image 402 represents a multimedia container. In one exemplary embodiment, shape 412 is a triangle. It is appreciated that shape 412 may be a different shape or may not be present. Label 410 indicates the name (e.g., user customizable name) of the multimedia container (e.g., "Social" for a social media multimedia container).

Images 404, 406, and 408 correspond to objects within a multimedia container corresponding to image 402. In one embodiment, images 404, 406, and 408 correspond to the most recently used or last accessed objects within the corresponding multimedia container. In one exemplary embodiment, image 406 is a scaled image of a social media widget of the social multimedia container that was most recently used. Image 406 may be larger than images 404 and 408 and centered within image 402. Image 404 corresponds to the social media widget that is the second most recently used and image 408 corresponds to the social media application that is the third most recently used. Image 402 thereby is operable to provide a visual reminder of what where the user was in the social media multimedia container and what activity the user was doing (e.g., browsing a social networking website, browsing a microblogging website, or submitting a message via a microblogging application). In one embodiment, images 404, 406, and 408 are updated periodically (e.g., once an hour, daily, or the like to reflect social media updates). For example, image 406 may be updated upon the updating of a social network status update from a user or his or her friends or network.

In one embodiment, selection of image 402 opens the corresponding social media multimedia container thereby allowing a user to access content, applications, and widgets within the social multimedia container. In another embodiment, images 404, 406, and 408 are selectable such that a user can select one of images 404, 406, and 408 and launch the appropriate action (e.g., launch the corresponding social media website or widget) corresponding to the selected image.

Figure 5:
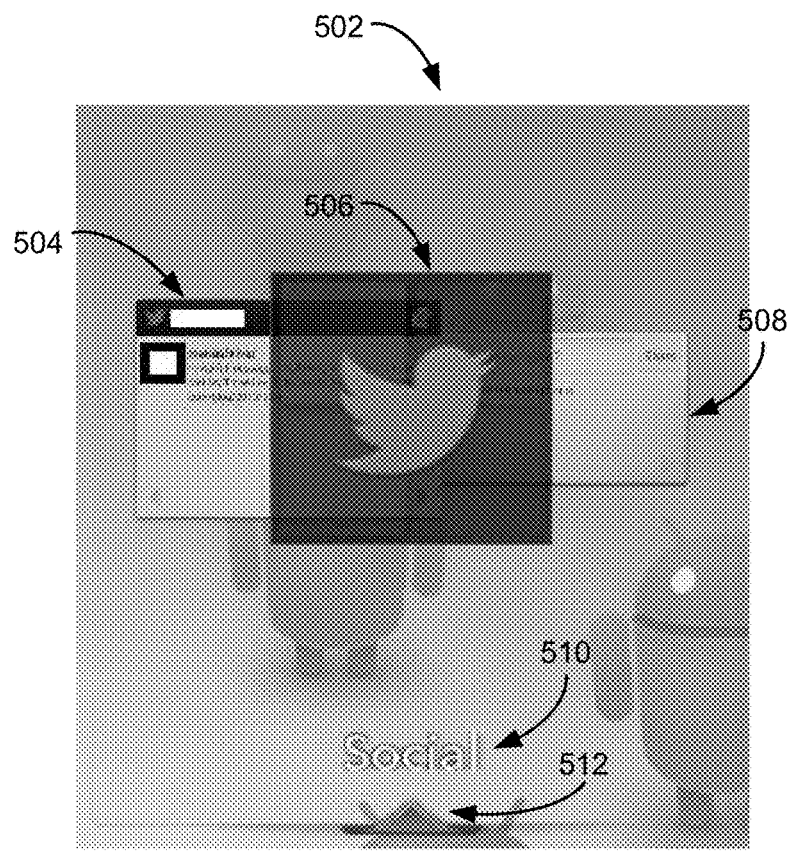
FIG. 5 shows a portion of an exemplary graphical user interface having a minimized social media container with an image corresponding to an application in accordance with one embodiment of the present invention.

FIG. 5 shows a portion of an exemplary graphical user interface having a minimized social media container with an image corresponding to an application in accordance with one embodiment of the present invention. In one embodiment, exemplary graphical user interface 500 includes elements similar to exemplary graphical user interface 400. FIG. 5 depicts a graphical user interface 500 comprising an image 502 of a minimized social media multimedia container.

Image 502 comprises shape 512, label 510, and images 504-508. Shape 512 is operable to indicate to a user that image 502 represents a multimedia container. In one exemplary embodiment, shape 512 is a triangle. It is appreciated that shape 512 may be a different shape or may not be present. Label 508 indicates the name (e.g., a user customizable name) of the multimedia container (e.g., "Social" for a social media multimedia container).

Images 504, 506, and 508 correspond to objects within a multimedia container corresponding to image 502. In one embodiment, images 504, 506, and 508 correspond to the most recently used or last accessed objects within the corresponding multimedia container. In one exemplary embodiment, image 506 corresponds to the social media widget that was the most recently used and image 504 corresponds to the social media application that was the second most recently used. Image 506 may be larger than images 504 and 508 and centered within image 502. Image 508 is a scaled image of a social media widget the social multimedia container that was the third most recently used. Image 502 thereby is operable to provide a visual reminder of what where the user was in the social media multimedia container and what activity the user was doing (e.g., browsing a social networking website, browsing a microblogging website, or submitting a message via a microblogging application). In one embodiment, images 504, 506, and 508 are updated periodically (e.g., once an hour, daily, or the like to reflect social media updates). For example, image 504 may be updated upon the updating of a microblogging entry from a user or his or her friends or network.

In one embodiment, selection of image 500 opens the corresponding social media multimedia container thereby allowing a user to access content, applications, and widgets within the social multimedia container. In another embodiment, images 504, 506, and 508 are selectable such that a user can select one of images 504, 506, and 508 and launch the appropriate action (e.g., launch the corresponding social media website or widget) corresponding to the selected image.

With reference to FIG. 6, flowchart 600 illustrates example functions used by various embodiments of the present invention for displaying a graphical user interface. Although specific function blocks ("blocks") are disclosed in flowchart 600, such steps are examples. That is, embodiments are well suited to performing various other blocks or variations of the blocks recited in flowchart 600. It is appreciated that the blocks in flowchart 600 may be performed in an order different than presented, and that not all of the blocks in flowchart 600 may be performed.

FIG. 6 shows a flowchart of an exemplary computer controlled process for generating a graphical user interface in accordance with one embodiment of the present invention. FIG. 6 depicts a process 600 for the adding (e.g., automatically) of social media widgets to a social media multimedia container and displaying of a graphical user interface for navigating and browsing the social media multimedia container.

At block 602, a data store, within a mobile device, corresponding to a social media multimedia container is accessed. In one embodiment, the multimedia container comprises a plurality of objects. A first subset of the plurality of objects comprises a first social media application and second social media application and a second subset of the plurality of objects comprises a social media widget. The social media multimedia container is operable to comprise one or more applications, widgets, pieces of content, and other multimedia containers.

In one embodiment, the first social media application may correspond to a social networking website. The second social media application may correspond to a microblogging website. In one exemplary embodiment, the plurality of objects further comprises a third social media application which corresponds to a social visual bookmarking website. The multimedia container may further comprise a third object corresponding to a voice-over-IP (VOIP) service application.

At block 604, whether a user has an account with a social media website is determined. Whether a user has an account with a social media website may be determined based on communication with one or more the social media websites with user credentials or via accessing an accounts feature or function of an operating system or application.

At block 606, a social media widget is added (e.g., automatically) to the social media multimedia container for a social media application corresponding to the social media website which the user has an account. In one embodiment, the social media widget is added based on the determination of whether a user has an account at one or more social media websites, as described herein.

At block 608, a first plurality of images each corresponding to the first social media application and the second social media application is displayed in a linear configuration (e.g., vertical column in a left side portion of a display screen).

At block 610, a first image corresponding to a social media widget is displayed. In one embodiment, the first image is adjacent to a second image of the plurality of images corresponding to the first social media application.

At block 612, a second image corresponding to the piece of content is displayed adjacent to the first image. In one embodiment, the social media multimedia container comprises a third object which corresponds to a piece of content.

A block 614, a third image corresponding to a second social media widget is displayed adjacent to the first plurality of images. In one embodiment, the second subset of objects may comprise the second social media widget.

Figure 7:
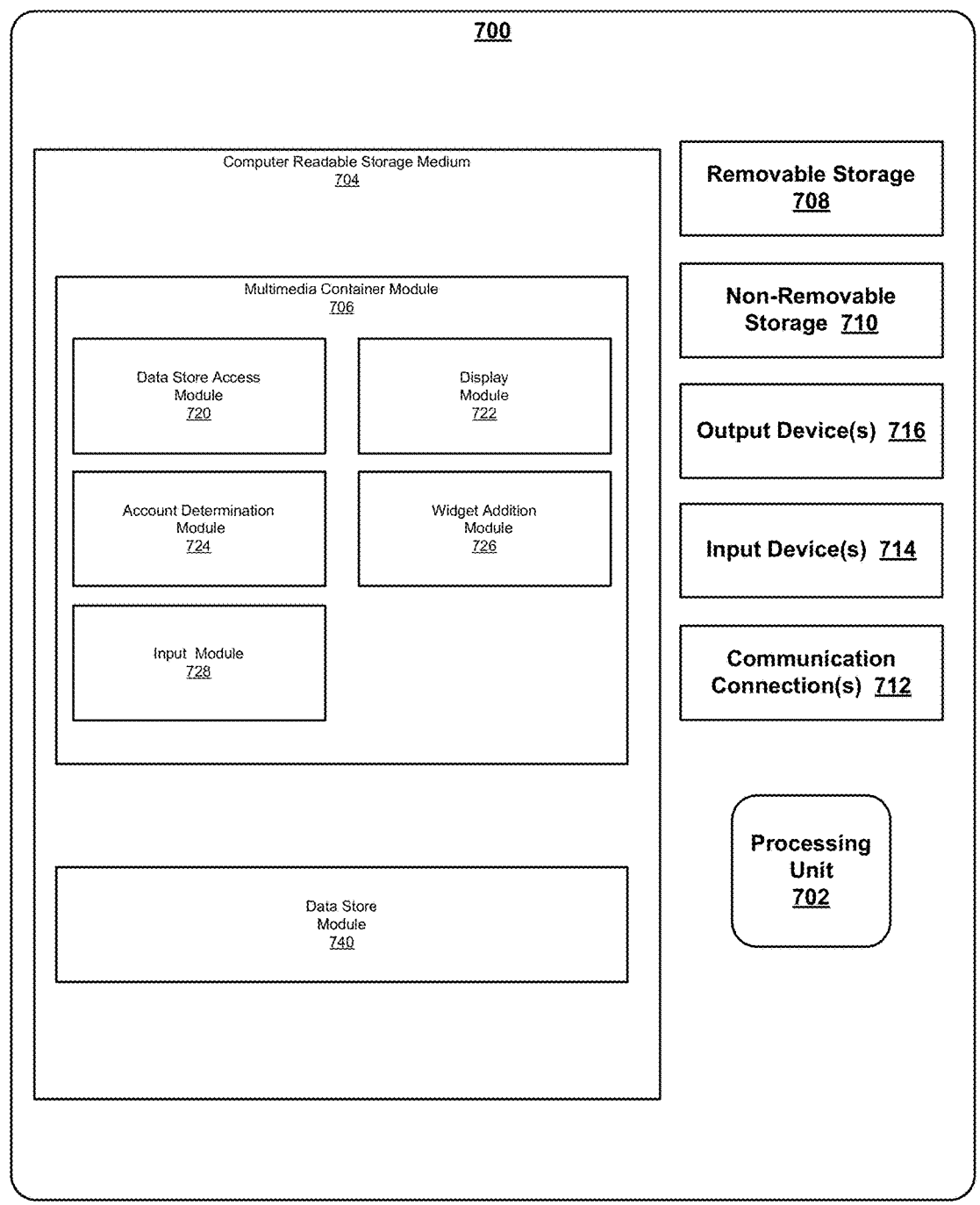
FIG. 7 shows a block diagram of an exemplary computing system and corresponding modules, in accordance with one embodiment of the present invention.

FIG. 7 illustrates exemplary components used by various embodiments of the present invention. Although specific components are disclosed in computing system environment 700, it should be appreciated that such components are exemplary. That is, embodiments of the present invention are well suited to having various other components or variations of the components recited in computing system environment 700. It is appreciated that the components in computing system environment 700 may operate with other components than those presented, and that not all of the components of system 700 may be required to achieve the goals of computing system environment 700.

FIG. 7 shows a block diagram of exemplary computer system and corresponding modules, in accordance with one embodiment of the present invention. With reference to FIG. 7, an exemplary system module for implementing embodiments includes a general purpose computing system environment, such as computing system environment 700. Computing system environment 700 may include, but is not limited to, servers, desktop computers, laptops, tablet PCs, tablet computing devices, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate efficient execution of memory operations or requests for groups of threads. Computing system environment 700 may further include a power source (e.g., battery) (not shown) operable to allow computing system environment 700 to be movable and mobile while operating.

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 10 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 712 may allow computing system environment 700 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a touch screen (e.g., capacitive touch screen), keyboard, mouse, pen, voice input device, touch input device, remote control, camera, etc. Output device(s) 716 such as a display (e.g., touch screen), speakers, etc. may also be included. All these devices are well known in the art and are not discussed at length.

In one embodiment, computer readable storage medium 704 includes multimedia container module 706 and data store module 740. Data store module 740 is operable to store data (e.g., data structures) corresponding to objects (e.g., pieces of content, applications, widgets, and other multimedia containers) within one or more multimedia containers (e.g., a social media multimedia container). Data store module 740 may further store information or data related to accounts that a user has with one or more websites (e.g., social media websites). Multimedia container module 706 includes data store access module 720, display module 722, account determination module 724, widget addition module 726, and input module 728.

In one embodiment, computer readable storage medium 704 may further include modules, e.g., of FIG. 14, as described in non-provisional patent application Ser. No. 13/601,363, entitled "SYSTEM AND METHOD FOR A MULTIMEDIA CONTAINER," with filing date May 23, 2013, and hereby incorporated by reference in its entirety.

Data store access module 720 is operable to access a portion of data store module 740 corresponding to a first multimedia container (e.g., a social multimedia container to be displayed). In one exemplary embodiment, the social media multimedia container comprises a plurality of objects. A first subset of the plurality of objects comprises a first social media application and second social media application and a second subset of the plurality of objects comprises a social media widget. The first social media application may correspond to a social networking website, a microblogging website, and a social visual bookmarking website, as described herein. The social media multimedia container is operable to comprise one or more applications, widgets, pieces of content, and other multimedia containers. The plurality of objects may further comprise a third social media application which corresponds to a social visual bookmarking website.

Display module 722 is operable to display a first plurality of images each corresponding to the first social media application and the second social media application in a vertical configuration at a left portion of a display device and further operable to display a first image corresponding to the social media widget. In one embodiment, the first image is adjacent to a second image of the plurality of images corresponding to the first social media application. In one exemplary embodiment, the social media widget is operable to display a selected update from a social media website viewable without launching a social media application or logging into a social media website In one embodiment, social media multimedia container comprises a third object which corresponds to a piece of content and the display module is operable to display a third image corresponding to the piece of content adjacent to the first image. In one exemplary embodiment, the second subset of objects comprises a second widget and the display module is operable to display a third image corresponding to the second widget adjacent to the first plurality of images. The third image corresponding to the second widget is operable to comprise a selected update from a social media website viewable without launching a social media application or logging into a social media website Account determination module 724 is operable to determine whether a user has an account with one or more social media websites, as described herein.

Widget addition module 726 is operable to add a respective widget to the multimedia container for each social media application corresponding to one or more social media websites which the user has an account.

Input module 728 is operable to receive input (e.g., touch or press input) for navigation (e.g., scrolling) of a social media multimedia container and selection of an icon, widget, piece of content, etc. displayed as part of the social media multimedia container, as described herein.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering a graphical user interface, said method comprising:

accessing, within a mobile device, a data store corresponding to a social media multimedia container, wherein said social media multimedia container comprises a plurality of objects, wherein a first subset of said plurality of objects comprises a first social media application and a second social media application and a second subset of said plurality of objects comprises a first social media widget, wherein said first social media application is configured to provide access within the mobile device to content of a website associated with said first social media application, wherein said first social media widget is configured to provide access within the mobile device to a portion of said content of said website associated with said first social media application, and wherein said social media multimedia container includes one or more applications, widgets, pieces of content, and other multimedia containers;

displaying a first plurality of images each corresponding to said first social media application and said second social media application in a linear configuration within said social media multimedia container; and displaying a first image that is configured to receive a user input and in response to the user input provide a user of the mobile device with access to content within said first social media widget within said social media multimedia container, wherein said first image is adjacent to a second image of said first plurality of images corresponding to said first social media application and said second social media application, wherein providing the user with access to the content within said first social media widget includes:

accessing recent content from a website associated with said first social media application;

displaying said recent content in said first social media widget adjacent to said second image of said first plurality of images corresponding to said first social media application and said second social media application; and enabling user interaction with said recent content via features of said first social media widget.

2. The method as described in claim 1, further comprising:
determining whether a user has an account with one or more social media websites; and automatically adding a respective widget to said social media multimedia container for each social media application corresponding to said one or more social media websites which said user has an account.

3. The method as described in claim 1, wherein said linear configuration is a vertical configuration.

4. The method as described in claim 1, wherein said social media multimedia container comprises a third object, wherein said third object corresponds to a piece of content, and said method further comprises:

displaying a third image corresponding to said piece of content adjacent to said first image.

5. The method as described in claim 4, wherein said piece of content is a piece of said portion of said content of said website associated with said first social media application, and wherein said piece of content is displayed within said social media multimedia container.

6. The method as described in claim 1, wherein said first social media application corresponds to a social networking website.

7. The method as described in claim 1, wherein said second social media application corresponds to a microblogging website.

8. The method as described in claim 1, wherein said plurality of objects further comprises a third social media application, wherein said third social media application corresponds to a social visual bookmarking website.

9. The method as described in claim 1, wherein said second image is configured to receive a user input and in response to the user input provide the user of the mobile device with access to content within said first social media application or said second social media application.

10. A non-transitory computer-readable storage medium having stored thereon, computer executable instructions that, if executed by a computer system cause the computer system to perform a method for rendering a graphical user interface, said method comprising:

accessing, within a mobile device, a data store corresponding to a social media multimedia container, wherein said social media multimedia container comprises a plurality of objects, wherein a first subset of said plurality of objects comprises a first social media application and a second social media application and a second subset of said plurality of objects comprises a first social media widget, wherein said first social media application is configured to provide access within the mobile device to content of a website associated with said first social media application, wherein said first social media widget is configured to provide access within the mobile device to a portion of said content of said website associated with said first social media application, and wherein said social media multimedia container includes one or more applications, widgets, pieces of content, and other multimedia containers;

determining whether a user has an account with a social media website;

automatically adding a social media widget to said social media multimedia container for a social media application corresponding to said social media website which said user has an account;

displaying a first plurality of images each corresponding to said first social media application and said second social media application in a vertical configuration at a left portion of a display device within said social media multimedia container; and displaying a first image that is configured to receive a user input and in response to the user input provide a user of the mobile device with access to content within said first social media widget within said social media multimedia container, wherein said first image is adjacent to a second image of said first plurality of images corresponding to said first social media application and said second social media application, wherein providing the user with access to the content within said first social media widget includes:

accessing recent content from a website associated with said first social media application;

displaying said recent content in said first social media widget adjacent to said second image of said first plurality of images corresponding to said first social media application and said second social media application; and enabling user interaction with said recent content via features of said first social media widget.

11. The non-transitory computer-readable storage medium as described in claim 10, wherein said social media multimedia container comprises a third object, wherein said third object corresponds to a piece of content, and said method further comprises:

displaying a third image corresponding to said piece of content adjacent to said first image.

12. The non-transitory computer-readable storage medium as described in claim 10, wherein said first social media application corresponds to a social networking website.

13. The non-transitory computer-readable storage medium as described in claim 10, wherein said second social media application corresponds to a microblogging website.

14. The non-transitory computer-readable storage medium as described in claim 10, wherein said plurality of objects further comprises a third social media application, wherein said third social media application corresponds to a social visual bookmarking website.

15. The non-transitory computer-readable storage medium as described in claim 10, wherein said social media multimedia container further comprises a third object corresponding to a voice-over-IP (VOID) service application.

16. The non-transitory computer-readable storage medium as described in claim 10, wherein said second subset of objects comprises a second social media widget and wherein said method further comprises:

displaying a third image corresponding to said second social media widget adjacent to said first plurality of images.

17. A system for displaying a graphical user interface, said system comprising:

memory configured to store computer readable instructions; and processing circuitry coupled to said memory and configured to execute said computer readable instructions to:

access, within a mobile device, a data store corresponding to a social media multimedia container, wherein said social media multimedia container comprises a plurality of objects, wherein a first subset of said plurality of objects comprises a first social media application and second social media application and a second subset of said plurality of objects comprises a first social media widget, wherein said first social media application is configured to provide access within the mobile device to content of a website associated with said first social media application, wherein said first social media widget is configured to provide access within the mobile device to a portion of said content of said website associated with said first social media application, and wherein said social media multimedia container includes one or more applications, widgets, pieces of content, and other multimedia containers;

display a first plurality of images each corresponding to said first social media application and said second social media application in a vertical configuration at a left portion of a display device within said social media multimedia container;

display a first image that is configured to receive a user input and in response to the user input provide a user of the mobile device with access to content within said first social media widget within said social media multimedia container, wherein said first image is adjacent to a second image of said first plurality of images corresponding to said first social media application and said second social media application, wherein providing the user with access to the content within said first social media widget includes:

accessing recent content from a website associated with said first social media application;

displaying said recent content in said first social media widget adjacent to said second image of said first plurality of images corresponding to said first social media application and said second social media application; and enabling user interaction with said recent content via features of said first social media widget.

18. The system as described in claim 17, wherein said social media multimedia container comprises a third object, wherein said third object corresponds to a piece of content, and said circuitry is further configured to display a third image corresponding to said piece of content adjacent to said first image.

19. The system as described in claim 17, wherein said first social media application corresponds to a social networking website.

20. The system as described in claim 17, wherein said second social media application corresponds to a microblogging website.

21. The system as described in claim 17, wherein said plurality of objects further comprises a third social media application, wherein said third social media application corresponds to a social visual bookmarking website.

22. The system as described in claim 17, wherein said second subset of objects comprises a second widget and wherein said circuitry is further configured to display a third image corresponding to said second widget adjacent to said first plurality of images, and wherein said third image corresponding to said second widget includes a selected update from a social media website viewable without launching a social media application or logging into a social media website.

* * * * *